Oct. 25, 1927.
A. O. MOE
1,646,701
CLEANING MACHINE FOR FRUIT, VEGETABLES, OR THE LIKE
Filed Dec. 1, 1924
4 Sheets-Sheet 4
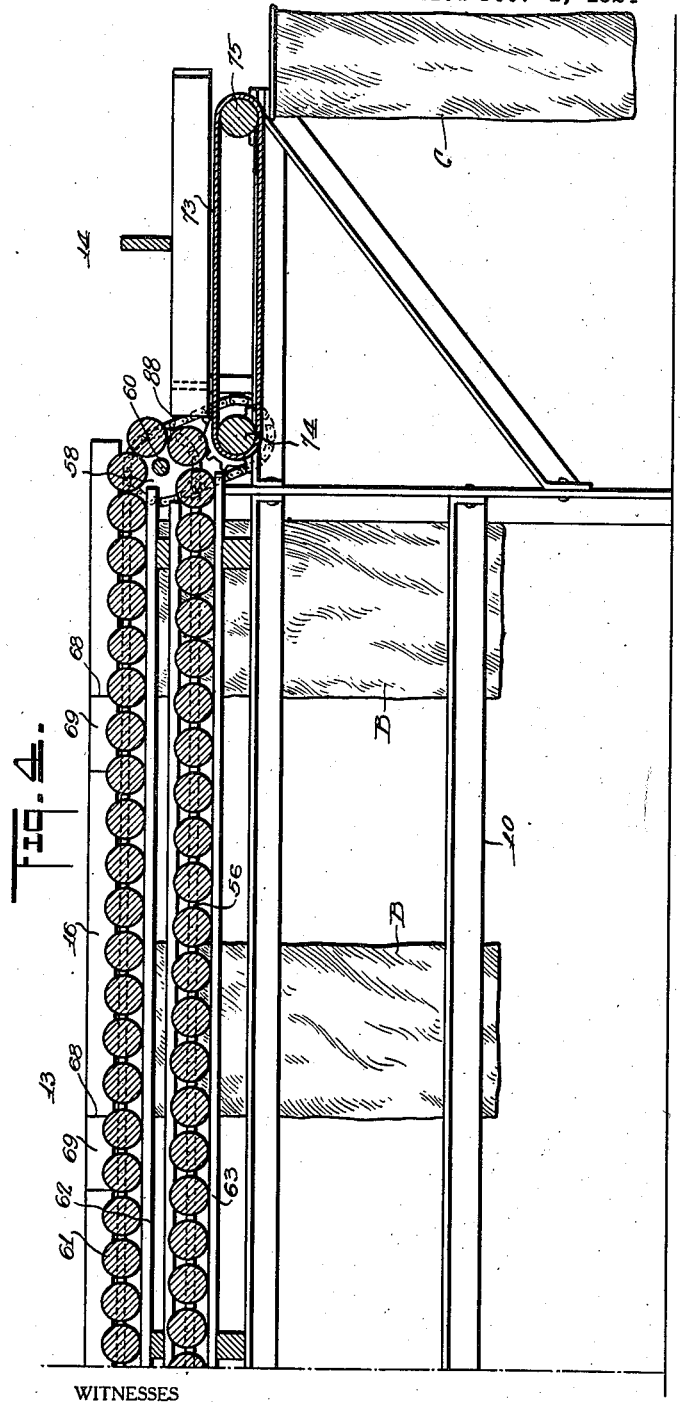
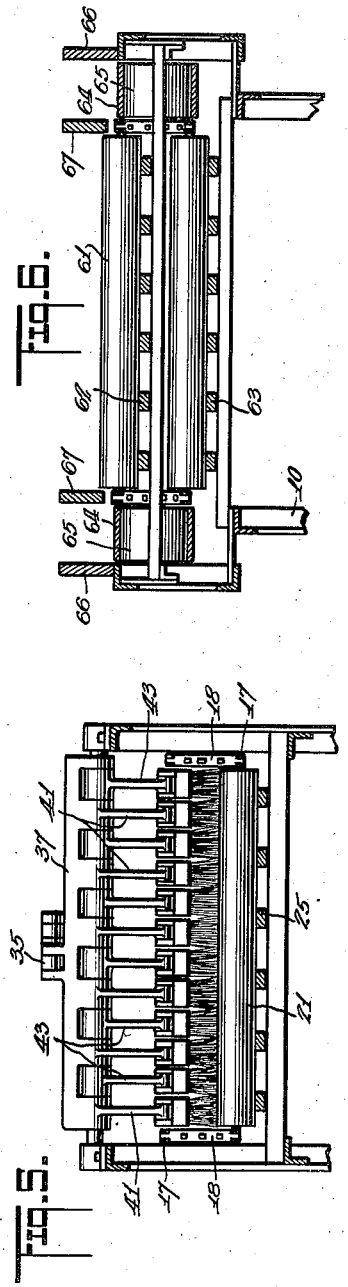
WITNESSES
INVENTOR
Andrew O. Moe.
BY
ATTORNEYS Patented Oct. 25, 1927.

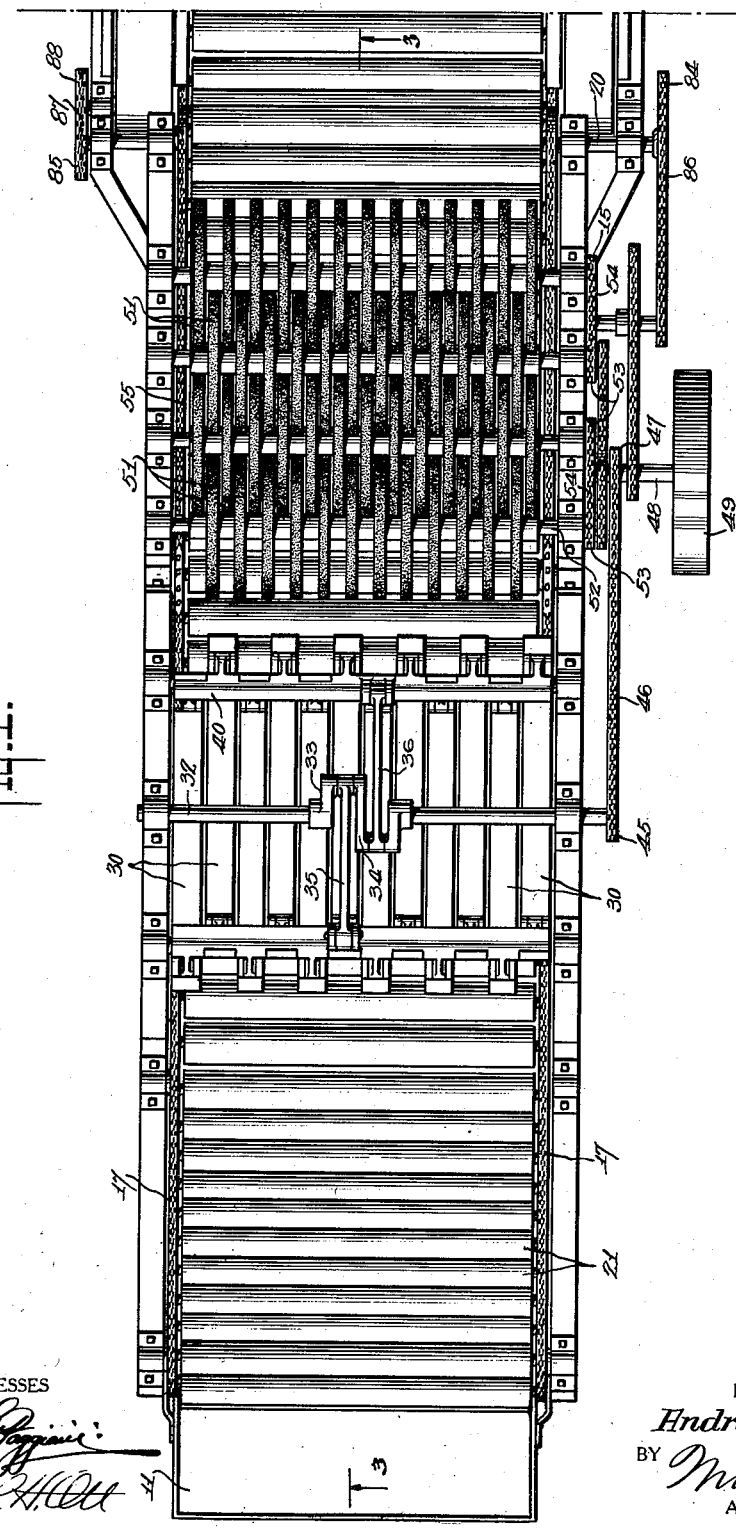

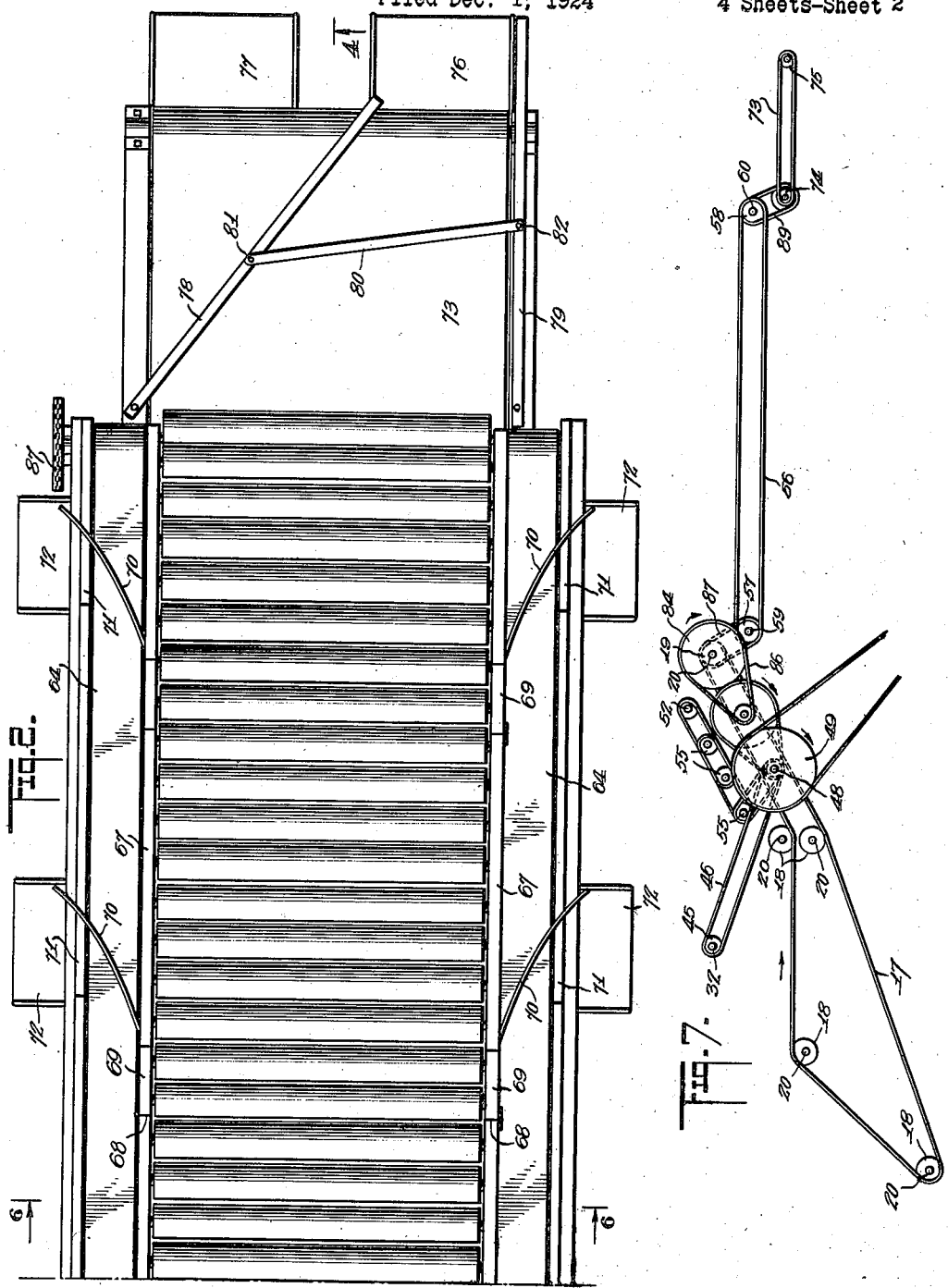

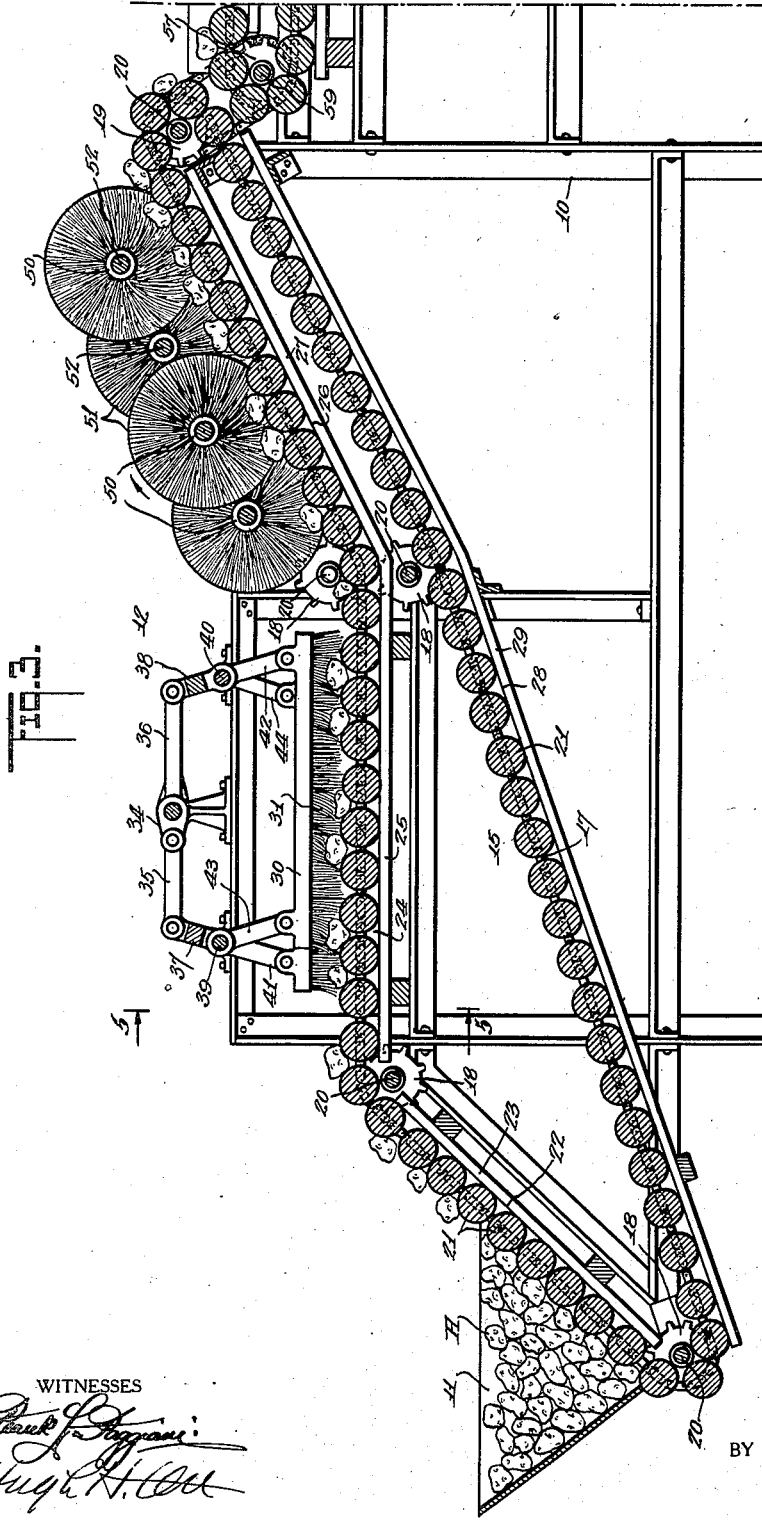

1,646,701

UNITED STATES PATENT OFFICE.

ANDREW O. MOE, OF TOPPENISH, WASHINGTON.

CLEANING MACHINE FOR FRUIT, VEGETABLES, OR THE LIKE.

Application filed December 1, 1924. Serial No. 753,215.

This invention has relation to machines for the cleaning, sorting and sacking of potatoes or other analogous vegetables and fruits, the same being in the nature of an improvement over a similar device set forth in my prior Letters Patent of the United States No. 1,357,794, granted to me on November 2, 1920.

The present improvement comprehends a machine of the character set forth which effectually subjects the entire surface of each piece of fruit to an oscillatory brushing action, a rotary brushing action, thence exposes the entire surface of the fruit to facilitate thorough inspection thereof, and finally feeds the fruit to a sacking mechanism, and this without danger of bruising or otherwise injuring the same by the machine.

The invention furthermore contemplates an improved fruit handling conveyor means which operates to continuously turn the fruit during its movement by the conveyor, whereby to subject all of the surface of each piece of fruit to the action of the cleaning means and to expose the entire surface of each piece of fruit to the sorters during the passage of the same over the sorting table.

The invention furthermore resides in the provision of a machine for facilitating the cleaning, sorting and packing of fruit, which machine is capable of handling a maximum capacity in a minimum of time.

The invention furthermore comprehends a sacking mechanism for the sorted fruit, which mechanism is of a semi-automatic nature and comparatively simple in its construction.

With the above recited and other objects in view, the invention consists in the improved features of construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figures 1 and 2 combined illustrate a complete top plan view of the machine.

Figs. 3 and 4 combined illustrate a complete longitudinal sectional view of the machine, the same being taken respectively on the lines 3—3 and 4—4 of Figs. 1 and 2.

Figs. 5 and 6 are transverse sectional views taken approximately on the lines 5—5 and 6—6 of Figs. 3 and 2.

Fig. 7 is a diagrammatic view of the driving mechanism of the machine.

Referring to the drawings by characters of reference 10 designates a suitable framework which respectively supports a hopper section 11 into which the potatoes or fruit to be cleaned, sorted and sacked are dumped, and which section may be hereafter termed the forward or front end of the machine. The framework further supports the cleaning section or unit designated generally by the reference character 12, the sorting section or unit designated generally by the reference character 13 and the sacking section or unit designated generally by the reference character 14. An endless conveyor 15 is suitably mounted on the frame for movement of its upper operative lead from the hopper 11 through the cleaning section 12. A second endless conveyor member 16 is mounted in the frame for movement on its upper operative lead throughout the length of the sorting section 13 and the forward end of the conveyor member 16 is disposed directly under the rear end of the conveyor member 15 so that the fruit discharged from the conveyor member 15 is received upon the conveyor member 16. The conveyor member 15 comprises a pair of laterally spaced flexible elements 17 preferably in the nature of sprocket chains which are trained over guide sprockets 18 and a drive sprocket 19 mounted on the transverse shafts 20 journaled in the frame-work for rotation. The conveyor member 15 further includes transverse flights in the form of rollers 21 which are journaled for rotation in the flexible elements or chains and are movable with the chains. The rollers or flights 21 are movable over the inclined bearing surface 22 of a member 23, the horizontal bearing surface 24 of a member 25, the inclined bearing surface 26 of the inclined portion 27 of the member 25 and the inclined surface 28 of a member 29 whereby the flights or rollers 21 are supported to relieve the flexible elements or chains 17 of the weight of the flights or rollers and whereby the rollers of the upper lead of the conveyor are rotated in the same direction as the direction of movement of the conveyor by contact of the periphery of the rollers with the surfaces 22, 24 and 26. This movement of the rollers in effect presents a supporting surface for the fruit or potatoes A which causes the continuous turning of the same while they are being handled by the operative lead of the conveyor 15.

The cleaning section 12 includes a plurality of oscillatory brush members 30 having bristled portions 31 disposed directly over the horizontal run of a conveyor. The oscillatory brushes 30 are arranged in side by side relation for longitudinal reciprocatory movement and alternate brushes are simultaneously reciprocated in opposite directions as the potatoes or fruit A are advanced and turned under the bristled portions by the movement of the conveyor. The mechanism for actuating the reciprocatory brushes 30 comprises a transversely mounted crank shaft 32 which includes a pair of diametrically oppositely disposed cranks 33 and 34 which are respectively connected by connecting rods 35 and 36 to the rock arms 37 and 38 attached to the oscillating shafts 39 and 40. Each alternate brush 30 is respectively connected at one end by rock arms 41 and 42 to the rock shafts 39 and 40, and the opposite end of each alternate brush is supported by link arms 43 and 44 loosely mounted on the rock shafts 39 and 40. The crank shaft 32 is provided at one end with a sprocket 45 which is operatively connected by a sprocket chain 46 with a drive sprocket 47 on the main drive shaft 48 which is provided with a main driving pulley 49. The cleaning section further includes a plurality of rotary brushes 50 having bristled portions 51, which brushes are mounted directly over the inclined run of the conveyor which overlies the member 27. The rotary brushes 50 are mounted in staggered transverse side by side relation and secured to transverse shafts 52, one end of each of which shafts is provided with a sprocket 53 around each pair of which a sprocket chain 54 is trained, the said sprockets 53 being further driven through intermediate sprockets 55 by sprocket chains trained over a sprocket on the main drive shaft 48.

From the foregoing it will thus be seen that the potatoes or fruit A dumped into the hopper 11 will be conveyed upwardly at an inclination by the rollers 21 until they reach the horizontal run where they will be conveyed horizontally under the reciprocating brushes 30. The rolling motion imparted to the rollers by their contact with the supporting surface will continuously turn the potatoes or fruit A while they are passing beneath and being operated upon by the brushes 30 so that the entire face of each piece of fruit is subjected to an effective brushing action for removing lumps or clods of earth. The potatoes or fruit A are then carried by the conveyor to the inclined run where they are subjected to the action of the revolving brushes 50 which brushes are designed to remove dust and particles of earth that may have broken loose but not entirely removed by the reciprocating brushes and which revolving brushes further serve to polish the potatoes or fruit.

The conveyor member 16 which receives the potatoes discharged from the conveyor member 15 is of substantially identical construction as the conveyor 15 and hence consists of laterally spaced endless flexible elements or sprocket chains 56 which are trained around the driven and guide sprockets 57 and 58 mounted respectively at the forward and rear ends of the sorting section 13 on transverse shafts 59 and 60. The conveyor is further provided with transverse flights or rollers 61 which are journaled for rotation with their opposite ends in the flexible elements or chains 56 and the upper and lower leads are respectively movable over vertically spaced tables 62 and 63 to support the weight of the flights or rollers and particularly to impart to the rollers of the upper lead a rolling motion by their contact with the surface of the table 62 whereby the fruit or potatoes are continuously turned throughout their movement through the sorting section to expose the entire surface of each piece of fruit to the sorters who stand at opposite sides of the sorting section of the machine for the purpose of removing bruised, injured or defective fruit. At each side of the conveyor member 16 a conveyor belt 64 is mounted for movement in the same direction with the conveyor. The conveyor belts are trained over guide and driven pulleys 65. At each side of the conveyor belts a pair of walls 66 and 67 are arranged and said walls together with the upper leads of the conveyor belts define troughs. The innermost walls 67 are provided with longitudinally spaced cutaway portions 68 defining doorways which are normally closed by outwardly swingable hinged doors 69. From the rear edge of each doorway a deflector blade 70 is disposed in an outward and forward angle and bears against the rear wall of a notched portion 71 in the outer walls of the troughs 66. Supported by the frame of the machine below each notched portion 71 is a chute or spout 72, to the discharge end of which a sack B is designed to be attached. It thus follows that the sorters observing a bruised or otherwise defective piece of fruit or potato passing through the sorting section brushes or moves the same through the doorways 68 and onto the conveyor belt 64 where they will be carried against the deflector blades 70 and discharged laterally through the notched portion 71 onto the chutes or spouts 72 and thence into the sacks B. The perfect fruit or potatoes which remain are conveyed by the conveyor 16 from whence they are discharged onto an endless conveyor element 73 constituting a part of the sacking mechanism 14. The endless conveyor element 73 is trained around drive and guide rollers 74 and 75 so that the forward end of the element 73 is disposed directly beneath the rear end of the conveyor member 16. At the rear end of the conveyor element 73 and supported by the frame directly beneath the conveyor element a pair of laterally spaced chutes or spouts 76 and 77 are provided which are designed to have connected with the discharge end thereof the sacks C. In order to alternately deflect and discharge the fruit or potatoes from the conveyor element 73 into the chutes 76 and 77 and thence to the sacks C whereby while one sack is being filled, the filled sack may be removed and an empty sack applied to the opposite chute member, a pair of pivoted guide members 78 and 79 are provided which directly overlie the conveyor element 73. The guide members 78 and 79 are connected by a connecting bar 80 which is pivoted as at 81 and 82 to the guide members so that when one guide member is disposed parallel with the longitudinal axis of the machine, the opposite guide member will be disposed at an angle across the conveyor element 73, whereby said guide members combine to direct the fruit or potatoes separately onto the chutes 76 and 77. It is, of course, understood that the switch of the flow of fruit or potatoes from one trough or chute to the other is rapidly accomplished to prevent the fruit or potatoes from falling between the two chutes.

In order to drive the conveyor 16, the conveyor belts 64 and the conveyor element 73, the transverse shaft 20 which has keyed thereto the drive sprocket 19 is further provided with sprockets 84 and 85, the former being connected by a sprocket chain 86 with a train of reducing sprockets and chains to the main drive shaft 48. The latter sprocket 85 is connected by a sprocket chain 87 with a sprocket 88 on the transverse shaft 59 to drive the driven sprockets 57 and the sprocket chains 56, which in turn drive the conveyor belt 64. The transverse shaft 60 is further provided with a sprocket 87 connected by a sprocket chain 89 with the drive roller 74 which drives the endless conveyor element 73 of the sacking unit.

I claim:

1. A machine of the character described comprising a plurality of reciprocating cleaning elements, a plurality of revolving brushes having their axes in a common inclined plane, and an endless conveyor member, one lead of which is movable under the reciprocating cleaning element and which inclines upwardly under the revolving brushes, said conveyor comprising a pair of laterally spaced endless flexible driven elements having transverse relatively rotatable flights, and members having supporting surfaces over which the rotatable flights are movable and with which they engage to impart rotation thereto in the same direction as the direction of movement of the conveyor and which direction is such as to cause an upward movement of the conveyor under the revolving brushes, whereby to rotate fruit or the like supported thereby and subjecting the entire surface of each piece of fruit or the like to the cleaning action of the cleaning elements and brushes.

2. In a machine for cleaning fruits, vegetables or the like, a moving conveyor element, a plurality of scrubbing brushes mounted transversely of the machine and in side-by-side relation directly over the conveyor element, and mechanism for reciprocating the alternate scrubbing brushes in opposite directions to cause the same to maintain the fruit or the like substantially at the same relative position on the conveyor element.

3. In a machine for cleaning fruits, vegetables, or the like, a moving conveyor element, a plurality of scrubbing brushes mounted transversely of the machine and in side-by-side relation directly over the conveyor element, and mechanism for reciprocating the alternate scrubbing brushes in opposite directions to cause the same to maintain the fruit or the like substantially at the same relative position on the conveyor element; in combination with brushing means for subsequently dusting off and polishing the fruits or the like, said latter means consisting of a plurality of rotary brushes arranged in staggered relation, said brushes being mounted to dispose the same at a longitudinal inclination extending upwardly and away from the scrubbing brushes and with the conveyor element guided upwardly thereunder.

ANDREW O. MOE.